US011816097B2

(12) United States Patent
Detwiler et al.

(10) Patent No.: US 11,816,097 B2
(45) Date of Patent: Nov. 14, 2023

(54) GEOGRAPHICAL LOCATION DETERMINATION SYSTEM

(71) Applicant: Capital One Services, LLC, McLean, VA (US)

(72) Inventors: Lindsay Detwiler, Lewisville, TX (US); Kukumina Pradhan, Bangalore (IN); Lokesh S. Tulshan, Bangalore (IN); Anirban Majumdar, Bangalore (IN); Kuldeep Kashinath Marganache, Frisco, TX (US); Joshua Jonalagada, Euless, TX (US); Jodi Lynn Boddie, Plano, TX (US); Omead Banihasherni, Oak Point, TX (US); Subramanyan Srinivasa, Allen, TX (US); Manish R. Chhabra, Frisco, TX (US); Mayur Gupta, Frisco, TX (US); David Berry, Coweta, OK (US)

(73) Assignee: Capital One Services, LLC, McLean, VA (US)

( * ) Notice: Subject to any disclaimer, the term of this patent is extended or adjusted under 35 U.S.C. 154(b) by 150 days.

(21) Appl. No.: 17/342,001

(22) Filed: Jun. 8, 2021

(65) Prior Publication Data
US 2022/0391384 A1 Dec. 8, 2022

(51) Int. Cl.
*G06F 16/00* (2019.01)
*G06F 16/23* (2019.01)
*G06F 16/29* (2019.01)

(52) U.S. Cl.
CPC .......... *G06F 16/2379* (2019.01); *G06F 16/29* (2019.01)

(58) Field of Classification Search
CPC .... G06F 16/2379; G06F 16/29; G06F 16/909; G06F 16/9537
See application file for complete search history.

(56) References Cited

U.S. PATENT DOCUMENTS 9,842,120 B1 * 12/2017 Siris .................... H04W 4/029
10,447,620 B2 10/2019 Bueker et al.
(Continued)

OTHER PUBLICATIONS

Yuan, X.; Chang, et al., Sequential Pattern Mining Algorithm Based on Text Data: Taking the Fault Text Records as an Example. Sustainability 2018, 10, 4330. < https://doi.org/10.3390/su10114330>.

(Continued)

*Primary Examiner* — Dinku W Gebresenbet
(74) *Attorney, Agent, or Firm* — Banner & Witcoff, Ltd.

(57) ABSTRACT

Systems and methods for determining accurate addresses for assets are described herein. According to some aspects, a plurality of addresses associated with an asset are compiled from sources such as database systems. For the plurality of address records, scores that correspond to attributes of the address records can be determined. Attributes associated with the address records may include a recency, a source, a date, license plate data, or address type, to name several non-limiting examples. Additionally, a zone of interest for the asset can be determined based on the plurality of address records. The plurality of address records is prioritized based on their distance from the zone of interest and the scores associated with them and, based on the priority, a subset of the plurality of address records is sent to, for example, a service provider.

20 Claims, 7 Drawing Sheets

(56) References Cited

U.S. PATENT DOCUMENTS

| | | |
|---|---|---|
| 10,504,081 B1 | 12/2019 | Han et al. |
| 10,530,723 B2 | 1/2020 | Milligan et al. |
| 11,250,216 B2 | 2/2022 | Demme et al. |
| 11,281,680 B2 | 3/2022 | Agarwalla et al. |
| 2019/0075097 A1* | 3/2019 | Campbell ............... H04L 63/12 |
| 2020/0210442 A1* | 7/2020 | Bergeron ............ G06F 16/2365 |

OTHER PUBLICATIONS

Maylawati, D.S., et al., An idea based on sequential pattern mining and deep learning for text summarization, J. Phys.: Conf. Ser., 1402 (2019) 077013. <https://doi.org/10.1088/1742-6596/1402/7/077013>.

* cited by examiner

FIG. 7

# GEOGRAPHICAL LOCATION DETERMINATION SYSTEM

BACKGROUND

Determining accurate geographical location information (e.g., addresses) for individuals, assets, or businesses is frequently a difficult and labor-intensive task. But accurate geographical information is required for a number of applications including insurance, theft prevention, auditing, inventory management, debt collection, etc. Previous data systems have had problems accurately determining the correct geographical locations due to conflicting multiple addresses, out of date contact information, or simply inaccurate contact information, to name a few non-limiting examples. It is, therefore, sometimes necessary to verify geographical location information.

In the past, the only way to verify customer contact information was to employ people to physically verify contact information's accuracy by traveling to the location of the contact and determine whether an asset was physically located there. This method is costly and time consuming. Thus, methods that reduce or eliminate the need for human action while still accurately verifying customer contact information are needed.

SUMMARY

The following summary presents a simplified summary of certain features. The summary is not an extensive overview and is not intended to identify key or critical elements.

Systems and methods for determining accurate customer information are described herein. According to some aspects, a plurality of customer records (e.g., customer address records) associated with an asset are compiled from sources such as database systems. For the plurality of address records, scores that correspond to attributes of the address records can be determined. Attributes associated with the address records may include a recency, a source, a date, license plate data, or address type, to name several non-limiting examples. Additionally, a zone of interest for the asset can be determined based on the plurality of address records. The plurality of address records is prioritized based on their distance from the zone of interest and the scores associated with them and, based on the priority, a subset of the plurality of address records is sent to, for example, a service provider.

In some aspects, updated information relating to the subset of the plurality of address record is received from, for example, a service provider. The prioritization of the plurality of address records is updated based on the received updated information and the subset of the plurality of address records can be updated based on the updated priority. The updated subset can then be sent to the service provider. Additionally, in some aspects, a second subset of the plurality of address records can be sent to, e.g., the service provider after a predetermined time interval.

According to some aspects of the disclosure, a device comprising one or more processors is provided. The device may also include memory configured to store computer instructions that, when executed by the one or more processors, cause the device to compile a plurality of customer records (e.g., customer address records) associated with an asset from sources such as database systems. The instructions may also cause the device to determine scores that correspond to attributes of the address records for the plurality of address records and determine a zone of interest for the asset based on the plurality of address records. Further, the device may prioritize the plurality of address records based on their distance from the zone of interest and the scores associated with them and, based on the priority, a subset of the plurality of address records is sent to, for example, a service provider.

In some aspects, a non-transitory computer readable storage medium is provided. The non-transitory computer readable storage medium may contain computer instructions that, when executed by one or more processors, cause the processors to compile a plurality of customer records (e.g., customer address records) associated with an asset from sources such as database systems. The instructions may also cause the device to determine scores that correspond to attributes of the address records for the plurality of address records and determine a zone of interest for the asset based on the plurality of address records. Further, the device may prioritize the plurality of address records based on their distance from the zone of interest and the scores associated with them and, based on the priority, a subset of the plurality of address records is sent to, for example, a service provider.

BRIEF DESCRIPTION OF THE DRAWINGS

Some features are shown by way of example, and not by limitation, in the accompanying drawings. In the drawings, like numerals reference similar elements.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques that allow for improved automation and back-end prioritization of address data. In this way, more efficient systems and methods for verifying actual physical address locations can be employed.

In the past, verifying customer contact or address information required significant expenditure of human capital—e.g., requiring people to physically verify contact information's accuracy by traveling to the location of the contact and determine whether an asset was physically located there. This method is costly and time consuming. The present disclosure describes ways to leverage a digital activity footprint of a customer (e.g., electronic records relating to credit/debit card transactions, online purchases, etc.) in order to increase the efficiency. This information can be used to prioritize customer address information that is more likely to be accurate because it is, for example, recent, from a trusted source, or of a type that is likely to be highly accurate. In other words, unlike past solutions, the processes and devices of the present disclosure take advantage of significant electronic data available about customers associated with an asset and can, based on that significant data, quickly determine which of a number of address records is likely to be accurate so that time and efforts need not be wasted attempting to verify unlikely addresses.

Before discussing these concepts in greater detail, however, several examples of a computing device that may be used in implementing and/or otherwise providing various aspects of the disclosure will first be discussed with respect to FIG. 1.

Figure 1:
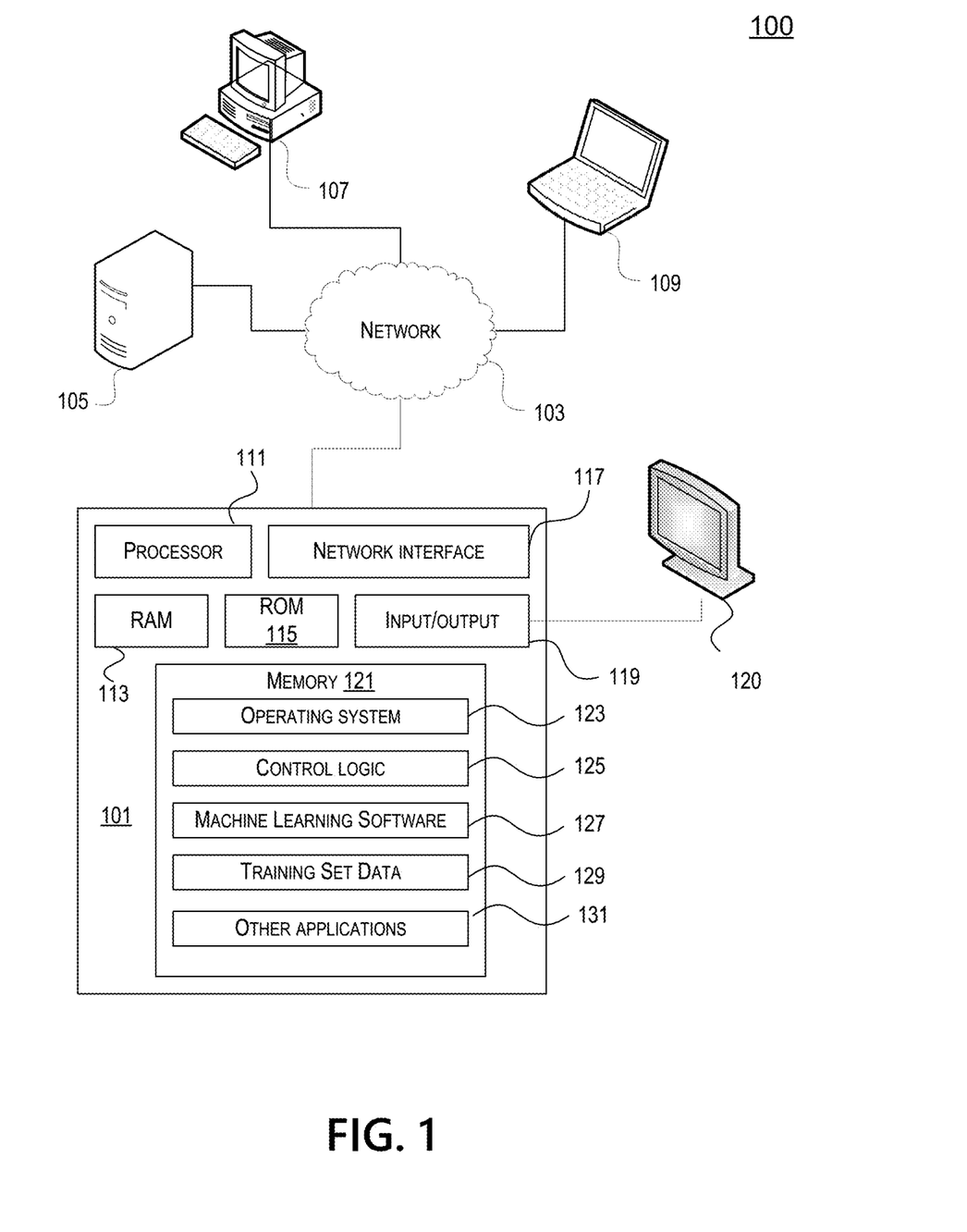
FIG. 1 is diagram of a system that can be used to implement various components described in the disclosure.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

Figure 2:
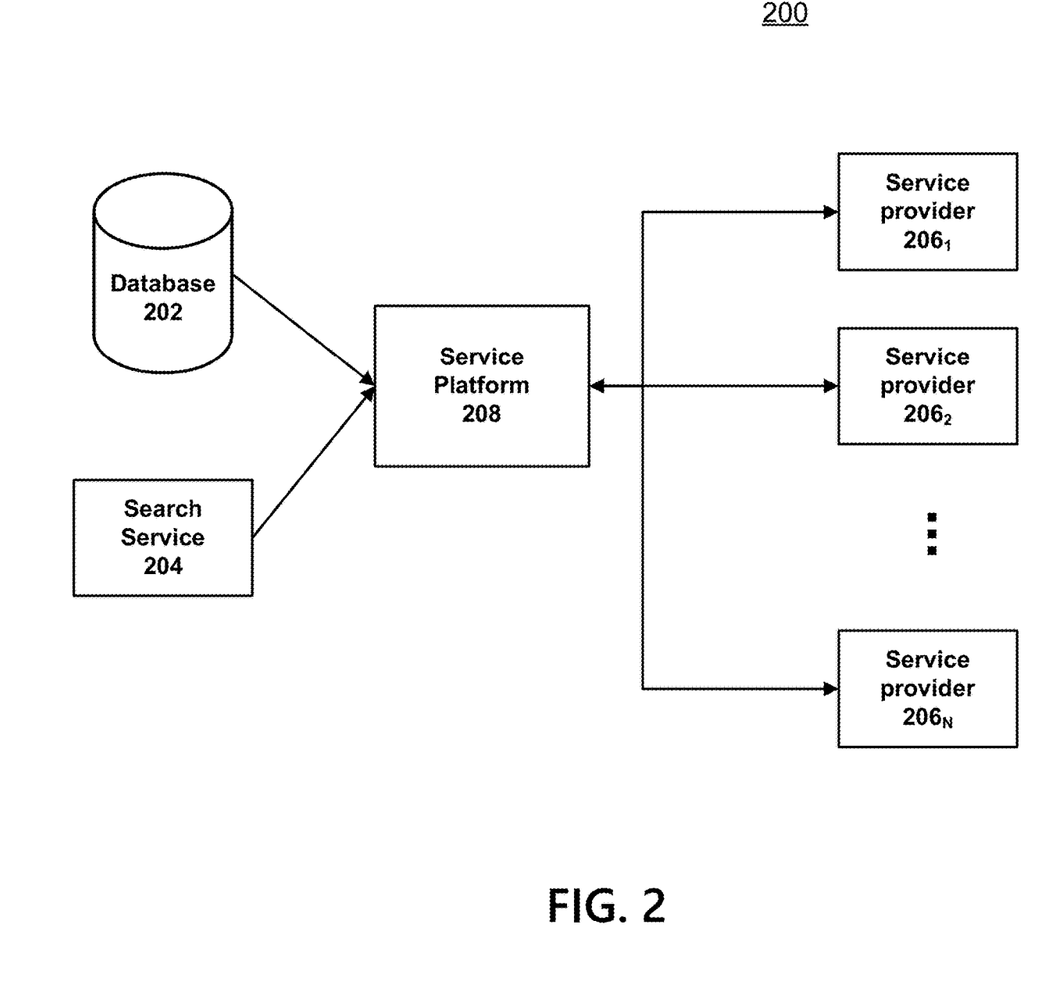
FIG. 2 is a functional block diagram of a system in accordance with various aspects of the disclosure.

FIG. 2 is a functional block diagram depicting system 200 that can be used to implement several aspects of the current disclosure. As shown in FIG. 2, system 200 includes a service platform 208, which may be communicatively coupled to database 202 and/or search service 204. According to some aspects, database 202 may contain customer or borrower data relating to a number of assets. For example, the database 202 may contain borrower information (e.g., home address, business address, telephone number, co-signer information, historical address information, to name a few non-limiting examples). Database 202 may also contain information relating to any accounts also associated with the borrower such as debit/credit card address information, addresses where credit/debit cards have been used, skip tracing notes from prior investigations, to name a few examples. That is, particularly, when the database 202 is operated by a lender and/or bank, it may contain a complete digital activity footprint that includes details like digital transaction data, the addresses/locations of frequented businesses, credit application information, historical transaction data, to name a few non-limiting examples. Additionally, in some instances this digital activity footprint information may contain more granular data. For example, it may be able to identify where a particular asset (for example, an automobile) is serviced regularly, the frequency of that service, which garage and/or gas station (continuing with the automobile example) the user prefers to use, and the frequency of that service based on the credit/debit card information and digital transaction data. Importantly, such digital activity footprint information may be used to corroborate and/or suggest which of several address records are more likely than not to be accurate—i.e., if a user frequently uses a gas station that is located near one of the residential address records for a user/asset, then it might be reasonable to conclude that the residential address record contains an accurate address for that user/asset's home address.

In some examples, search services may be used to confirm information in database 202 or to retrieve information not contained in database 202. Search services may be used to, for example, query information relating to the borrower associated with an asset including credit bureau files, motor vehicle registration information, driver's license information, the address of relatives, voter registration, police reports, addresses of past vehicle servicing history, and license plate recognition data, to name a few non-limiting examples. While FIG. 2 only depicts a single database 202 and a single search service 204, it should be understood that the service platform 208 may be communicatively coupled to several databases 202 and several search services 204 while remaining within the intent and spirit of the disclosure.

Service platform 208, which may be implemented (for example) using some or all components of system 100 shown in FIG. 1, may also be communicatively coupled to one or more service providers $206_1$, $206_2$, . . . $206_N$ (herein collectively referred to as "service providers 206"). Using information acquired from databases 202 and search services 204, service platform 208 may generate a list or subset of possible addresses associated with an asset. This list of subset of possible addresses can then be sent to one or more service providers 206 in order for the service providers to take appropriate action. For example, service providers 206 may be used to confirm a probable address or that an asset is actually located at an address on file.

To better explain the function of system 200, consider a case where a lender (employing system 200) needs to know the physical location of an automobile that is subject to an automobile loan. The system 200, using service platform 208, may query lender's database (e.g., database 202), which may contain a number of different physical addresses for the borrower. For example, it might contain her home address at the time she initiated the loan, her work address at the time she initiated the loan, address information related to any cosigners of the loan, etc. The lender, using service platform 208, may request this data from database 202. To supplement database 202 information, the lender may also query one or more search services 204 to receive credit bureau files, motor vehicle registration information, driver's license information, the address of relatives, voter registration, police reports, addresses of past vehicle servicing history, and license plate recognition data, etc. From all of the queried address information, service platform 208 may compile a number of different addresses into an address compilation associated with the automobile in question. Such an address compilation might look like record 302, as shown in FIG. 3.

Figure 3:
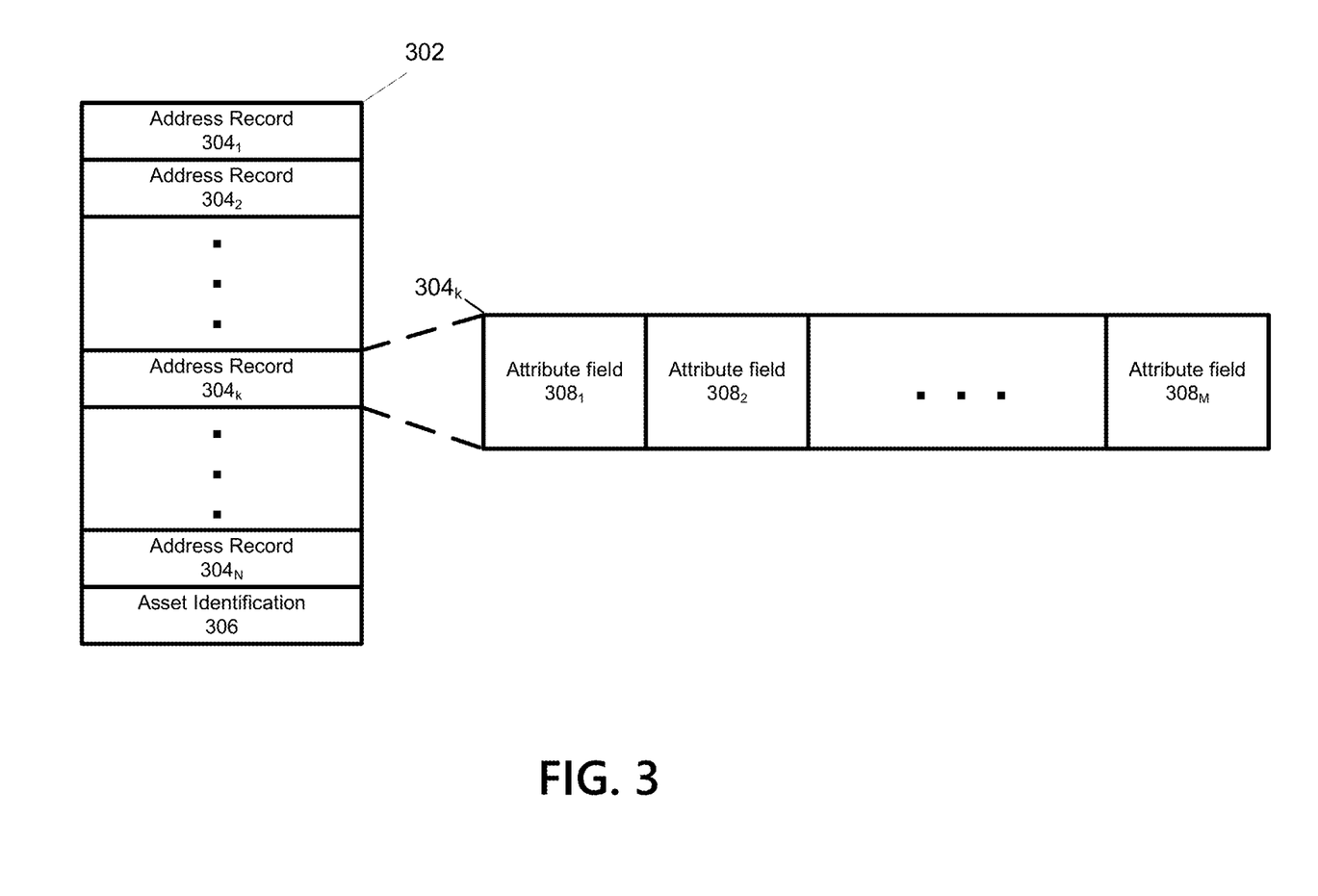
FIG. 3 represents a data structure that can be used in conjunction with various aspects of the disclosure.

FIG. 3 conceptually depicts an address compilation 302 according to various aspects of the disclosure. Compiled addresses 302 may include a number of different address records $304_1$, $304_2$, . . . , $304_k$, . . . , $304_N$ (collectively referred to herein as "address records 304"). Further, each address record 304 may contain several fields, e.g., $308_1$, $308_2$, . . . , $308_M$ (collectively "attributes 308") and the fields may contain attributes of the address record. As discussed above, attributes may include a recency of the address record (i.e., how old the record is), a source (e.g., application records, search service provider, credit report, etc.), a date, identifying information for the asset (e.g., license plate data, car make/model, color, etc.), or address type (e.g., business, residential, apartment, etc.), to name several non-limiting examples.

Figure 4:
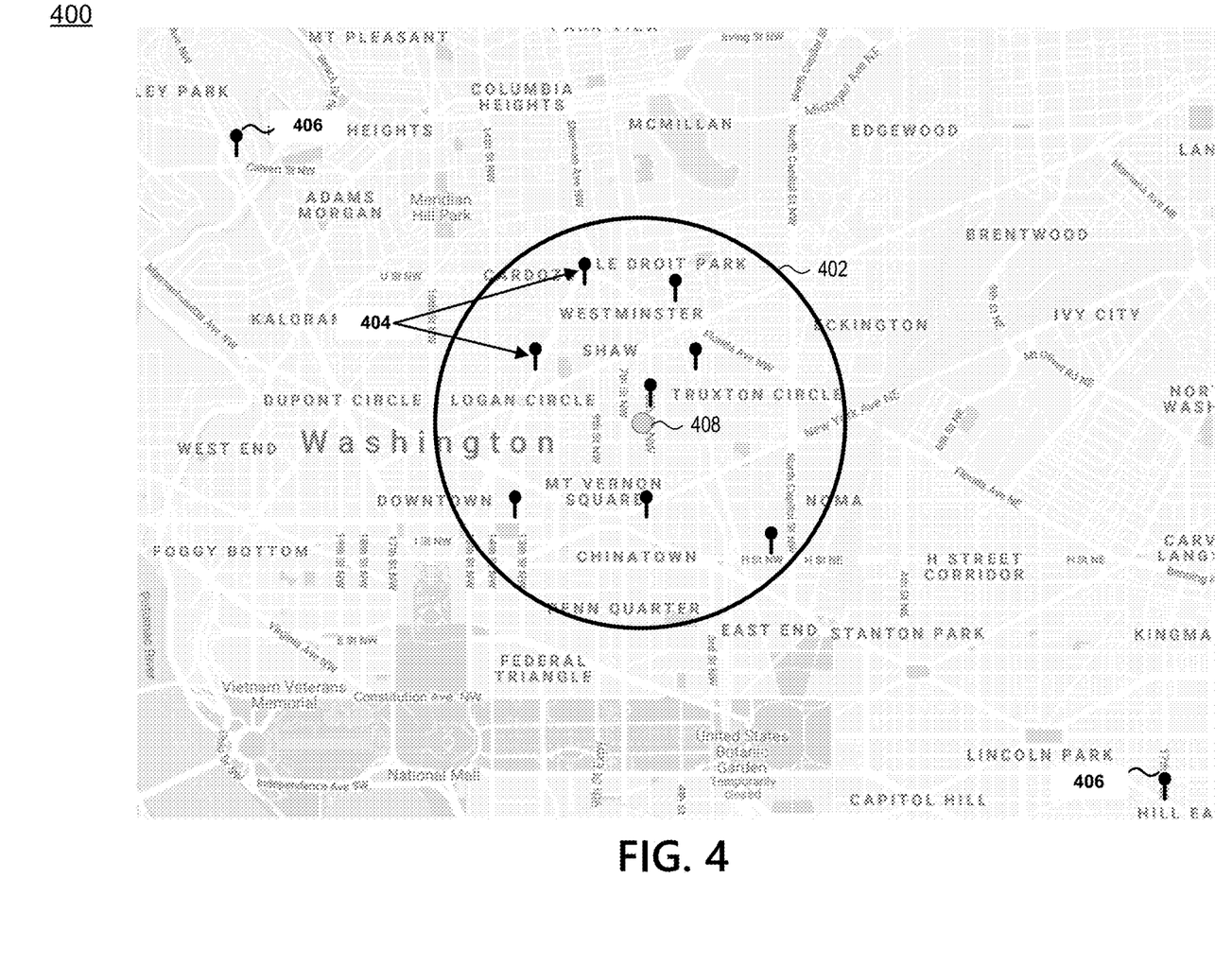
FIG. 4 is a map used to explain various aspects of the disclosure.

Continuing with our example relating to determining an address of an automobile subject to an automobile loan, the service platform 208 may compile records 302 from various data sources (e.g., databases 202 or service services 204). After processing the compiled records 302 (e.g., de-duplicating records, removing improper data, etc.), there may be a number of different records remaining. FIG. 4 depicts this situation with the compiled addresses indicated on a map by map pins. Based on address records 302, service platform 208 may determine a zone of interest 402 based on the locations of the various compiled addresses. This can be accomplished by, for example, determining a center point 408 of the compiled address records 302 and determining the zone to be a pre-determined distance from that center point 408. In some instances outlying addresses (e.g., distant addresses 306) may be ignored or discarded for the purposes of determining the zone of interest 402. At any rate, it should be understood that all of the compiled addresses need not fall within the zone of interest 402.

After determining the zone of interest 402, the service platform 208 may prioritize the addresses based on, at least in part, their location within the zone of interest, their distance from the center of the zone of interest, various attributes (e.g., recency, source, etc.) of the addresses, to name a few non-limiting examples. After the prioritization, a subset (e.g., subset 404) of addresses can be determined and this subset of addresses can be sent to one or more of the service providers 206. The service providers 206 may then use the addresses they receive to confirm the location of the asset. For example, in some instances, service providers may use their received addresses to send an investigator to that address to determine whether the address is correct for the asset.

Returning to our automobile example, the service providers 206 who receive the subset of addresses 404, may physically travel to the subset of addresses and determine whether the automobile is located there. The result of that determination can then be sent back to the service platform 208. In the event that the address can be confirmed, the address is verified and no further addresses need be investigated. However, if addresses in the subset cannot be verified, then this can be reported back to service platform 208, which can then update priority and the subset 404 based on the received report and transmit a new subset to one or more service providers. In this way, the addresses can be investigated such that the most likely addresses are investigated first. Additionally, according to some embodiments, it is also possible for the service platform 208 to send an updated or new subset of addresses to one or more service providers 206 after a pre-determined time has elapsed (e.g., several days with no information relating to the subset) even if updated information regarding the first subset has not been received from the service providers.

Figure 5:
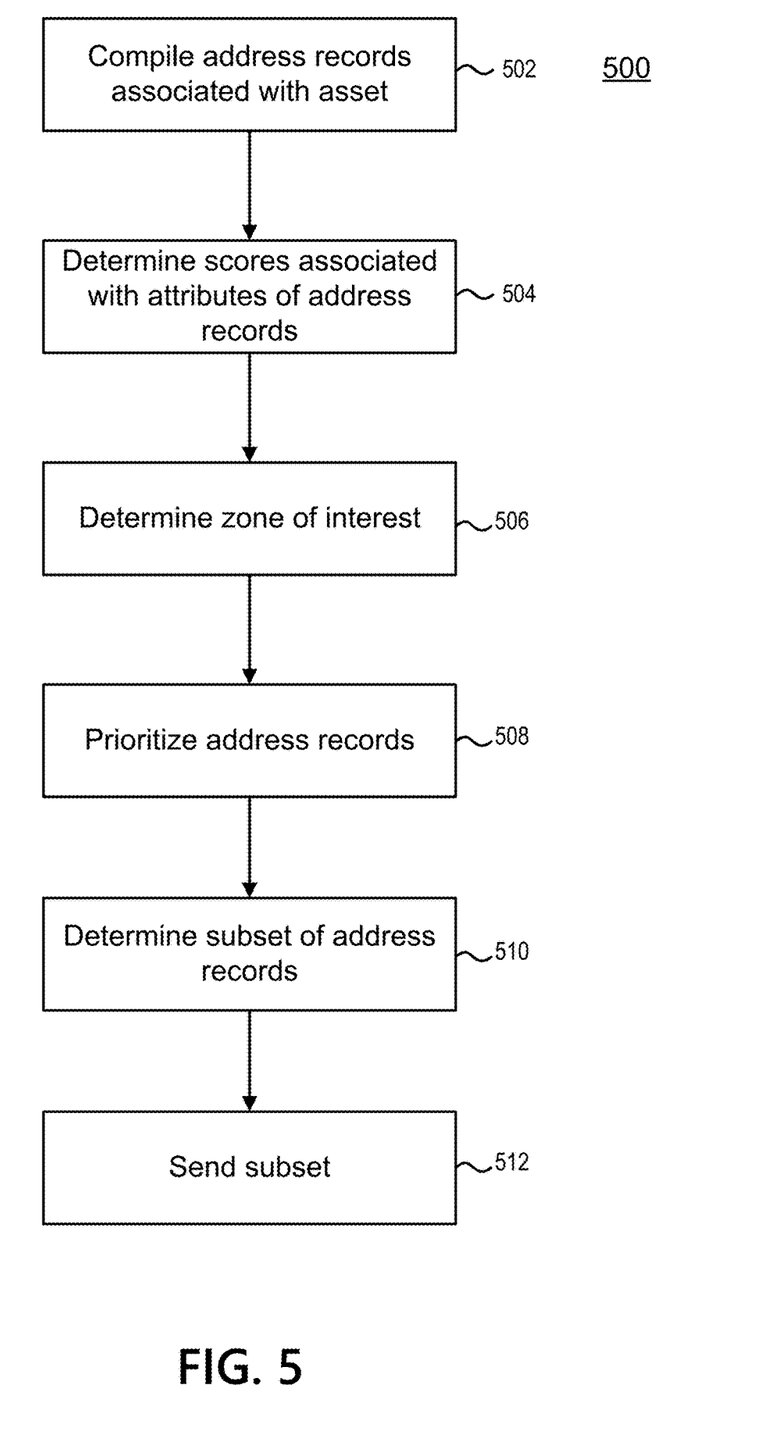
FIG. 5 is a flowchart depicting a method that may be used in accordance with one or more illustrative aspects described herein.

FIG. 5 is a flowchart depicting method 500, which may be practiced according to various aspects of this disclosure. For ease of explanation, FIG. 5 will be described with respect to FIGS. 1-4. However, it should be understood that this is just by way of example and that method 500 should not be understood to be limited to any of the specific embodiments described or shown in FIGS. 1-4.

As shown in FIG. 5, method 500 begins at 502, where address records associated with an asset are compiled by, e.g., the service platform 208. The address records may be the result of queries sent to a database (e.g., database 202), which may contain, among other things, information relating to a user's digital activity. For example, database 202 may contain transaction data (including address/location information) of recent credit/debit card transactions. Additionally, database 202 may contain address information relating to loan applications, co-signers, employment address information or the like. The service platform may also query one or more search services 204 to compile additional addresses. This kind of address information may include receive credit bureau files, motor vehicle registration information, driver's license information, the address of relatives, voter registration, police reports, addresses of past vehicle servicing history, and license plate recognition data, etc.

After generating the address compilation 302, at 504 the service platform 208 may determine and/or generate scores associated with the various compiled addresses 302. The scores may be generated or determined by various attributes 308 associated with each of the address records. For example, address records with attributes 308 indicating that the address relates to a user's home or work may be given a higher score than address records 304 with attributes 308 indicating that they relate to a different kind of location. Similarly, records with attributes 308 indicating that the record is more recent may be given a higher score than less recent records 304.

At 506, the service platform may determine a zone of interest 402 based, at least in part, on the location of the compiled address records 308. In some embodiments, the zone of interest may be determined by finding a center point 408 of the compiled address records and defining the zone of interest 402 to be a certain radius or distance from the center point 408. In some embodiments, outlying address records 304 (e.g., anomalous address records 304 or address records 304 very distant from the majority of the compiled address records 302) may be discarded or ignored for the purpose of determining the zone of interest 402. In some instances the zone of interest 402 may also be defined, for example, curve fitting to create a geographical zone around the compiled address records 302.

At 508, the address records 302 can be prioritized. According to various embodiments, the address records 302 can be prioritized according to a combination of the scores that have been generated for them and their relationship to the zone of interest 402. For example, recent address records 304 could be given a higher priority than older address records 304. Similarly, address records 304 located within a zone of interest 402 could be given a higher priority than address records 304 located without the zone of interest 402. Furthermore, even within the zone of interest, address records 304 may be differently prioritized based on their relationship to the zone of interest 402. For example, address records closer to a center point 408 of the zone of interest 402 may be given a higher priority than address records 304 further away from the center point 408. According to various embodiments, schema for prioritizing address records may be defined with any number of priority levels. For example, address records could be prioritized according to the schema indicated in the following table:

TABLE 1

| Priority Level | High Priority | Low Priority |
| --- | --- | --- |
| 1 | Inside Zone of interest | Outside zone of interest |
| 2 | More recent | Less recent |
| 3 | Closer to center point | Further away from center point |
| 4 | Received from trusted source | Received from less trusted source |
| 5 | Residential address | Commercial address |

With this schema, address records 304 could be first prioritized by whether they fall within the zone of interest 402 or not. Next, further priority sorting may occur based on a recency of the address record (i.e., address information collected recently could be prioritized over older address information). Next, according to this example schema, a proximity to center point 408 could be prioritized over address records that are located further away from the center point 408. Similarly, the source of address record information may be considered in the priority—for example, it might be determined that address record information relating to a digital activity footprint of a user based on their credit/debit card usage is more trusted than credit report information. This can be factored into the priority, as shown in the above table. Additionally, a preference for the kind of address (i.e., residential, commercial, etc.) may be factored into the priority at level 5, as shown above. To give an example of how priority can be determined, consider address records with the attributes shown in following table:

TABLE 2

| Rec. # | Within zone? | Distance from center | Recency | Source | Address type |
| --- | --- | --- | --- | --- | --- |
| 1 | No | 100 km | 2 weeks | Trusted | Commercial |
| 2 | Yes | 5 km | <1 week | Trusted | Residential |
| 3 | Yes | 10 km | 3 weeks | Trusted | Residential |
| 4 | No | 25 km | 3 weeks | Not trusted | Commercial |
| 5 | Yes | 7 km | 2 weeks | Trusted | Commercial |

By applying the priority schema defined in TABLE 1 to the records listed in TABLE 2, the address record priority shown in TABLE 3 (below) is reached.

TABLE 3

| Priority | Rec. # | Within zone? | Distance from center | Recency | Source | Address type |
| --- | --- | --- | --- | --- | --- | --- |
| 1 | 2 | Yes | 5 km | <1 week | Trusted | Residential |
| 2 | 5 | Yes | 7 km | 2 weeks | Trusted | Commercial |
| 3 | 3 | Yes | 10 km | 3 weeks | Trusted | Residential |
| 4 | 4 | No | 25 km | 3 weeks | Not trusted | Commercial |
| 5 | 1 | No | 100 km | 2 weeks | Trusted | Commercial |

At 510, a subset of address records (e.g., 404) may be determined based on determined priority. In some embodiments, this subset may comprise the top X number of address records (for instance, say the top two or three address records 302 by priority) based on the prioritization. It is also possible according to various embodiments, for all of the address records that meet certain criteria (e.g., all of the address records that are within the zone of interest and less than 1 week old) to be included in the subset of address records 404. At 512, the method 500 can send the subset of address records 404 to one or more service providers 206 for verification of the address.

Figure 6:
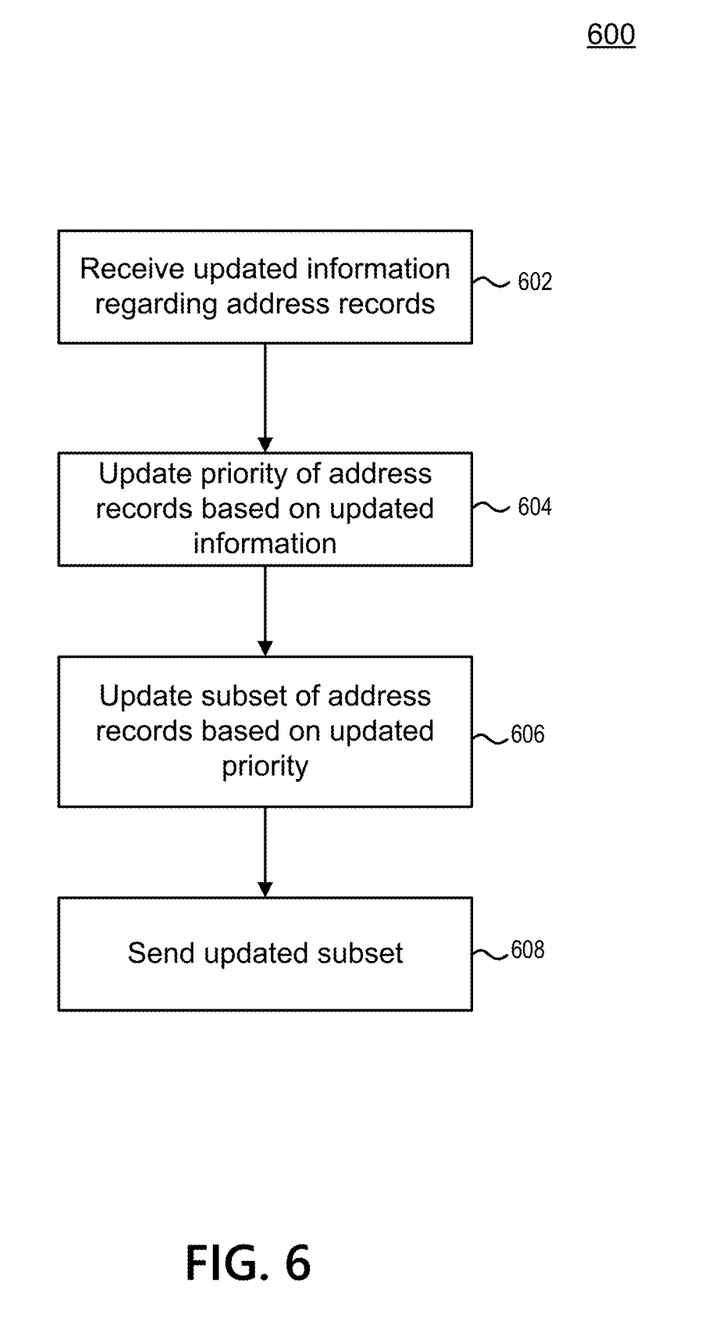
FIG. 6 is a flowchart depicting a method that may be used in accordance with one or more illustrative aspects described herein.

As previously alluded to, after service providers 206 receive the subset of address records 404, they can send updated information regarding the address records 404 to service platform 208. This process 600 is depicted in FIG. 6, which may be practiced according to various aspects of this disclosure. For ease of explanation, FIG. 6 will be described with respect to FIGS. 1-6. However, it should be understood that this is just by way of example and that method 600 should not be understood to be limited to any of the specific embodiments described or shown in FIGS. 1-6.

As shown in FIG. 6, method 600 begins when the service platform 208 receives updated information from, for example, one or more service provider 206 concerning one or more address records 304 in the subset of address records 404. For example, consider an example using the address records defined by tables 2 and 3, above, sorted according to the priority schema defined in table 1, above. Further consider that the initial subset 404 that was sent to the service providers 206 constituted the two highest priority address records—i.e., record numbers 2 and 5 as shown in table 3, above. At step 602, the method 600 may receive updated information that records 2 and 5 are not accurate.

Thus, at 604, the priority of address records could be updated to place records 2 and 5 at the lowest priority (as shown in TABLE 4, below).

| Pri-ority | Rec. # | Within zone? | Distance from center | Recency | Source | Address type |
|---|---|---|---|---|---|---|
| 1 | 3 | Yes | 10 km | 3 weeks | Trusted | Residential |
| 2 | 4 | No | 25 km | 3 weeks | Not trusted | Commercial |
| 3 | 1 | No | 100 km | 2 weeks | Trusted | Commercial |
| 4 | 2 | Yes | 5 km | <1 week | Trusted | Residential |
| 5 | 5 | Yes | 7 km | 2 weeks | Trusted | Commercial |

In some instances, address records that are found to be inaccurate may be deleted entirely from consideration rather than being prioritized. At any rate, at 606, method 600 updates the subset of records based on the updated priority. Continuing with our example, in this case the subset would be updated to delete records 2 and 5 from the subset and to add the new highest priority address records 3 and 4. At 608, the updated subset 404 can be sent to the one or more service providers 206.

As noted above, in some embodiments, service platform 208 may update the subset after a pre-determined amount of time has elapsed. For example, it may be determined that if no updated information about address records 404 is received within 3 days, that additional (albeit lower priority) addresses should be sent to one or more service providers for attempted verification. This process is described with respect to FIG. 7.

Figure 7:
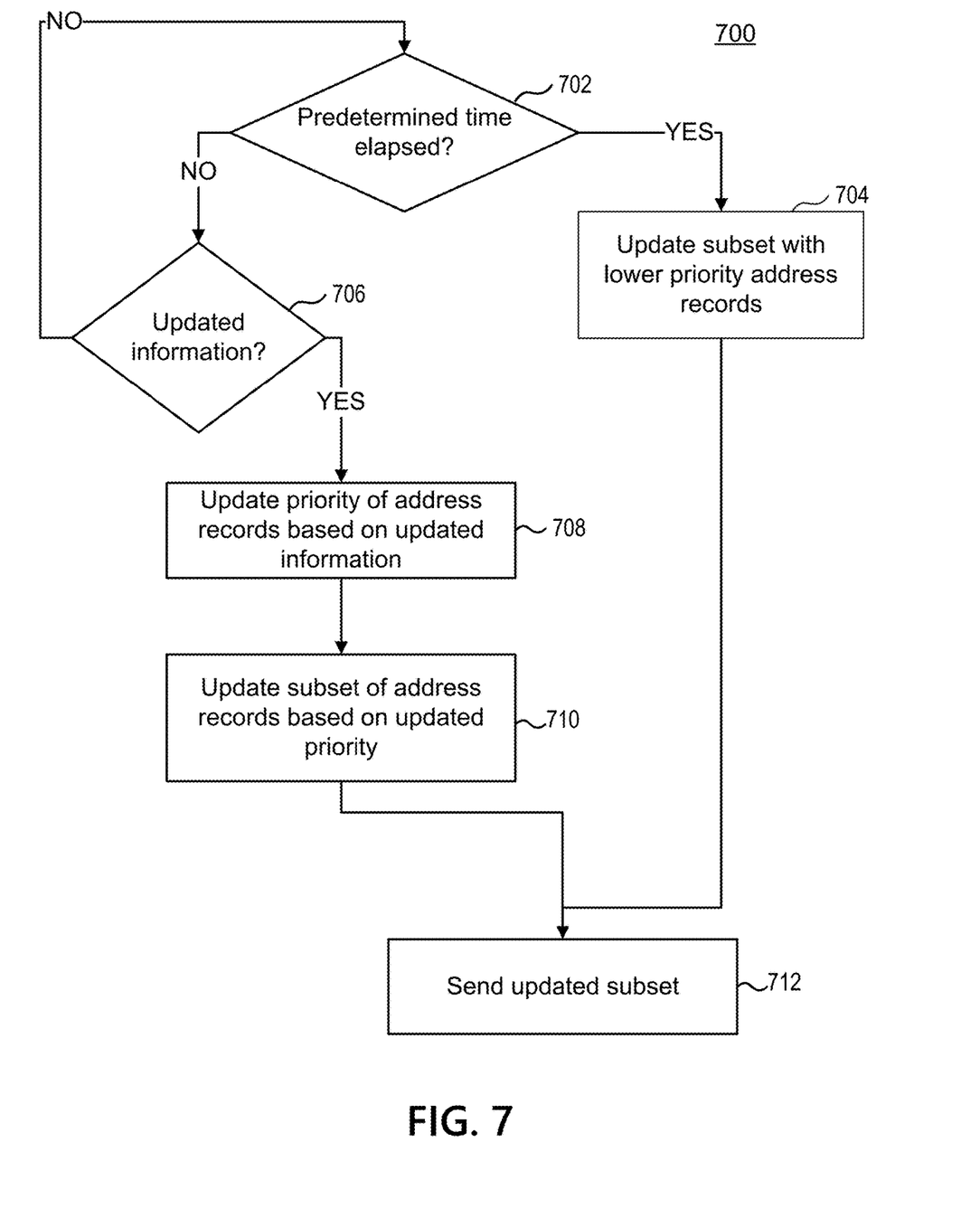
FIG. 7 is a flowchart depicting a method that may be used in accordance with one or more illustrative aspects described herein.

FIG. 7 is a flowchart depicting method 700, which may be practiced according to various aspects of this disclosure. For ease of explanation, FIG. 7 will be described with respect to FIGS. 1-6. However, it should be understood that this is just by way of example and that method 500 should not be understood to be limited to any of the specific embodiments described or shown in FIGS. 1-6.

As shown in FIG. 7, the method 700 determines whether a predetermined time (e.g., 3 days, a week, 2 weeks, etc.) has elapsed since a previous subset (e.g., subset 404) has been sent to one or more service providers 206. If the predetermined amount of time has elapsed, then, at 704, the subset is updated to include lower priority address records and that updated subset is sent to one or more service providers 206 at 712.

If, however, at 702, it is determined that the predetermined time has not elapsed, then method 700 can determine whether any updated information regarding the address records in the subset 404 has been received at 706. If no additional or updated information has been received at 706, then the method 700 can branch back to the beginning. If, however, updated information has been received then the method 700 can proceed to update the priority of address records 304 based on the received updated information. This could be performed, for example, in accordance with method 600 described in FIG. 6, above.

Once the priority of the address records 304 has been updated, then the subset 404 can be updated based on the updated priority at 710. For example, if the top priorities are changed based on the updated information, then the new higher priority address records 304 can be included in the subset 404. It is also possible that, where prior members of the subset have declined in priority, those members can be removed from the updated subset. Once the subset is updated at 710, the updated subset can be sent to one or more service providers at 712.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for providing a data tokenization, de-tokenization, validation, and/or re-tokenization service.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A computer-implemented method, comprising:
   compiling, from one or more database systems and based on a digital activity footprint of a user associated with an asset, a plurality of address records associated with the asset, wherein the digital activity footprint comprises digital transaction data associated with the user;
   determining, for each address record of the plurality of address records, a plurality of attributes of the address record, wherein the plurality of attributes includes a recency attribute that indicates how recently the address record was collected, a trust attribute that indicates whether a source of the address record is trusted, and an address type attribute that indicates whether the address record is for a residential address associated with the user;
   determining, based on the plurality of address records, a zone of interest;

generating a prioritized list of address records by prioritizing the plurality of address records based on:
 a distance determined based on a respective address record of the plurality of address records and the zone of interest,
 the recency attribute of the respective address record,
 the trust attribute of the respective address record, and
 the address type attribute of the respective address record;
selecting, based on the prioritized list of address records, a subset of address records; and
sending the subset of address records to one or more service providers.

2. The computer-implemented method of claim 1, further comprising:
receiving, from the one or more service providers, updated information relating to the subset of address records;
generating, based on the updated information, an updated prioritized list of address records; and
selecting, based on the updated prioritized list of address records, an updated subset of address records.

3. The computer-implemented method of claim 1, wherein the prioritizing of the plurality of address records is performed such that the prioritized list of address records is generated based on a priority schema that:
based on the distance, provides increased priority to the respective address record if the respective address record is located closer to a center of the zone of interest than another address record that is located farther from the center of the zone of interest,
based on the recency attribute of the respective address record, provides increased priority to the respective address record if the respective address record was collected more recently than another address record,
based on the source attribute of the respective address record, provides increased priority to the respective address record if the respective address record was received by a first source that is more trusted than a second source from which another address record was received,
based on the address type attribute of the respective address record, provides increased priority to the respective address record if the respective address record is for the residential address associated with the user.

4. The computer-implemented method of claim 2, further comprising:
sending the updated subset of address records to at least one of the one or more service providers after a predetermined time interval from when the subset of address records was sent.

5. The computer-implemented method of claim 1, wherein prioritizing the addresses is performed based on the recency attribute of the respective address record by providing increased priority to the respective address record if the respective address record was been collected more recently than at least one other address record in the plurality of address records.

6. The computer-implemented method of claim 1, wherein the prioritizing the addresses is performed based on the address type attribute of the respective address record by providing increased priority to the respective address record if the respective address record is for a residential address associated with the user instead of a commercial address associated with the user.

7. The computer-implemented method of claim 1, wherein the prioritizing the addresses is performed based on the distance by providing increased priority to the respective address record if the respective address record is within the zone of interest and at least one other address record is outside the zone of interest.

8. The computer-implemented method of claim 1, wherein the prioritizing the addresses is performed based on the distance by providing increased priority to the respective address record if the respective address record is closer a center of the zone of interest as compared to at least one other address record.

9. The computer-implemented method of claim 1, wherein the compiling is performed by:
querying the one or more database systems for address entries relating to the asset;
deleting duplicate results from the address entries; and
parsing the address entries to generate the plurality of address records.

10. The computer-implemented method of claim 1, wherein the digital activity footprint of the user includes one or more of credit card usage information, debit card usage information, or digital transaction data.

11. A device comprising:
one or more processors; and
memory storing computer instructions that, when executed by the one or more processors, cause the device to:
 compile, from one or more database systems and based on a digital activity footprint of a user associated with an asset, a plurality of address records associated with the asset, wherein the digital activity footprint comprises digital transaction data associated with the user;
 determine, for each address record of the plurality of address records, a plurality of attributes of the address record, wherein the plurality of attributes includes a recency attribute that indicates how recently the address record was collected, a trust attribute that indicates whether a source of the address record is trusted, and an address type attribute that indicates whether the address record is for a residential address associated with the user;
 determine, based on the plurality of address records, a zone of interest;
 generate a prioritized list of address records by prioritizing the plurality of address records based on:
  a distance determined based on a respective address record of the plurality of address records and the zone of interest,
  the recency attribute of the respective address record,
  the trust attribute of the respective address record, and
  the address type attribute of the respective address record;
 select, based on the prioritized list, a subset of address records;
 send the subset of address records to one or more service providers;
 receive, from one or more service providers, updated information relating to the subset of address records; and
 send, based on the updated information and to one or more service providers, an updated subset of address records.

12. The device of claim 11, wherein the computer instructions when executed by the one or more processors, cause the device to:
generate, based on the updated information, an updated prioritized list of address records, and
select, based on the updated prioritized list of address records, the updated subset of address records.

13. The device of claim 11, wherein the computer instructions, when executed by the one or more processors, cause the device to send the updated subset of address records to at least one of the one or more service providers after a predetermined time interval from when the subset of address records was sent.

14. The device of claim 11, wherein the computer instructions, when executed by the one or more processors, cause the device to compile the plurality of address records by:
querying the one or more database systems for address entries relating to the asset;
deleting duplicate results from the address entries; and
parsing the address entries to generate the plurality of address records.

15. The device of claim 11, wherein prioritizing the plurality of address records is performed such that the prioritized list of address records is generated based on a priority schema that:
based on the distance, provides increased priority to the respective address record if the respective address record is located closer to a center of the zone of interest than another address record that is located farther from the center of the zone of interest,
based on the recency attribute of the respective address record, provides increased priority to the respective address record if the respective address record was collected more recently than another address record,
based on the source attribute of the respective address record, provides increased priority to the respective address record if the respective address record was received by a first source that is more trusted than a second source from which another address record was received,
based on the address type attribute of the respective address record, provides increased priority to the respective address record if the respective address record is for the residential address associated with the user.

16. One or more non-transitory computer readable media storing computer instructions that, when executed, cause a computing device to:
compile, from one or more database systems and based on a digital activity footprint of a user associated with an asset, a plurality of address records associated with the asset wherein the digital activity footprint comprises digital transaction data associated with the user;
determine, for each address record of the plurality of address records, a plurality of attributes of the address record, wherein the plurality of attributes includes a recency attribute that indicates how recently the address record was collected, a trust attribute that indicates whether a source of the address record is trusted, and an address type attribute that indicates whether the address record is for a residential address associated with the user;
determine, based on the plurality of address records, a zone of interest;
generate a prioritized list of address records by prioritizing the plurality of address records based on:
a distance determined based on a respective address record of the plurality of address records and the zone of interest,
the recency attribute of the respective address record,
the trust attribute of the respective address record, and
the address type attribute of the respective address record;
select, based on the prioritized list of address records, a subset of address records;
send the subset of address records to one or more service providers;
receive, from one or more service providers, updated information relating to the subset address records; and
send, based on the updated information and to the one or more service providers, an updated subset of address records.

17. The one or more non-transitory computer readable media of claim 16, wherein the computer instructions, when executed, cause the computing device to:
generate, based on the updated information, an updated prioritized list of address records; and
select, based on the updated prioritized list of address records, the updated subset of address records.

18. The one or more non-transitory computer readable media of claim 16, wherein the computer instructions, when executed, cause the computing device to:
send the updated subset of address records to a service provider after a predetermined time interval from when the subset of address records was sent.

19. The one or more non-transitory computer readable media of claim 16, wherein the computer instructions, when executed, cause the computing device to compile the plurality of address records by:
querying the one or more database systems for address entries relating to the asset;
deleting duplicate results from the address entries; and
parsing the address entries to generate the plurality of address records.

20. The one or more non-transitory computer readable media of claim 16, wherein prioritizing the plurality of address records is performed such that the prioritized list of address records is generated based on a priority schema that:
based on the distance, provides increased priority to the respective address record if the respective address record is located closer to a center of the zone of interest than another address record that is located farther from the center of the zone of interest,
based on the recency attribute of the respective address record, provides increased priority to the respective address record if the respective address record was collected more recently than another address record,
based on the source attribute of the respective address record, provides increased priority to the respective address record if the respective address record was received by a first source that is more trusted than a second source from which another address record was received,
based on the address type attribute of the respective address record, provides increased priority to the respective address record if the respective address record is for the residential address associated with the user.

* * * * *